United States Patent [19]

Cook, Jr.

[11] Patent Number: 4,792,972
[45] Date of Patent: Dec. 20, 1988

[54] REMOTE PROGRAMMING OF CATV CHANNEL AUTHORIZATION UNIT

[75] Inventor: Alex M. Cook, Jr., Lilburn, Ga.

[73] Assignee: Scientific-Atlanta, Inc., Atlanta, Ga.

[21] Appl. No.: 897,878

[22] Filed: Aug. 19, 1986

[51] Int. Cl.$^4$ ............................................. H04N 7/167
[52] U.S. Cl. ...................................... 380/20; 358/349; 380/10; 455/4
[58] Field of Search .................... 380/10, 20; 358/349; 455/4

[56] References Cited

U.S. PATENT DOCUMENTS

| | | |
|---|---|---|
| 4,418,424 | 11/1983 | Kawamoto et al. . |
| 4,430,669 | 2/1984 | Cheung ................................ 380/20 |
| 4,450,481 | 5/1984 | Dickinson ............................ 380/10 |
| 4,460,922 | 7/1984 | Ensinger et al. ..................... 380/20 |
| 4,475,123 | 10/1984 | Dumbauld et al. .................. 380/20 |
| 4,482,947 | 11/1984 | Zato et al. . |
| 4,495,654 | 1/1985 | Deiss . |
| 4,510,623 | 4/1985 | Bonneau et al. . |
| 4,527,194 | 7/1985 | Sirazi . |
| 4,530,008 | 7/1985 | McVoy ................................ 380/13 |
| 4,558,464 | 12/1985 | O'Brien, Jr. ......................... 380/20 |
| 4,574,305 | 3/1986 | Campbell et al. .................... 455/5 |

Primary Examiner—Stephen C. Buczinski
Attorney, Agent, or Firm—Banner, Birch, McKie & Beckett

[57] ABSTRACT

Method and apparatus is disclosed for programming a CATV channel authorization unit. In a cable television (CATV) system, a CATV transmitter provides a plurality of CATV system channels to a channel authorization unit which in turn supplies only selected ones of the system channels to a user. The CATV authorization unit determines which selected channels the user will receive by receiving channel authorization data from a CATV system programmer. The channel authorization data is received via an infrared data communication link such that programming can be done without physical disassembly of the CATV channel authorization unit and without the system programmer being physically present within the users household. In a further embodiment, the CATV channel authorization unit is also responsive to a user transmitter for determining which of the selected channels the user is presently viewing.

13 Claims, 5 Drawing Sheets

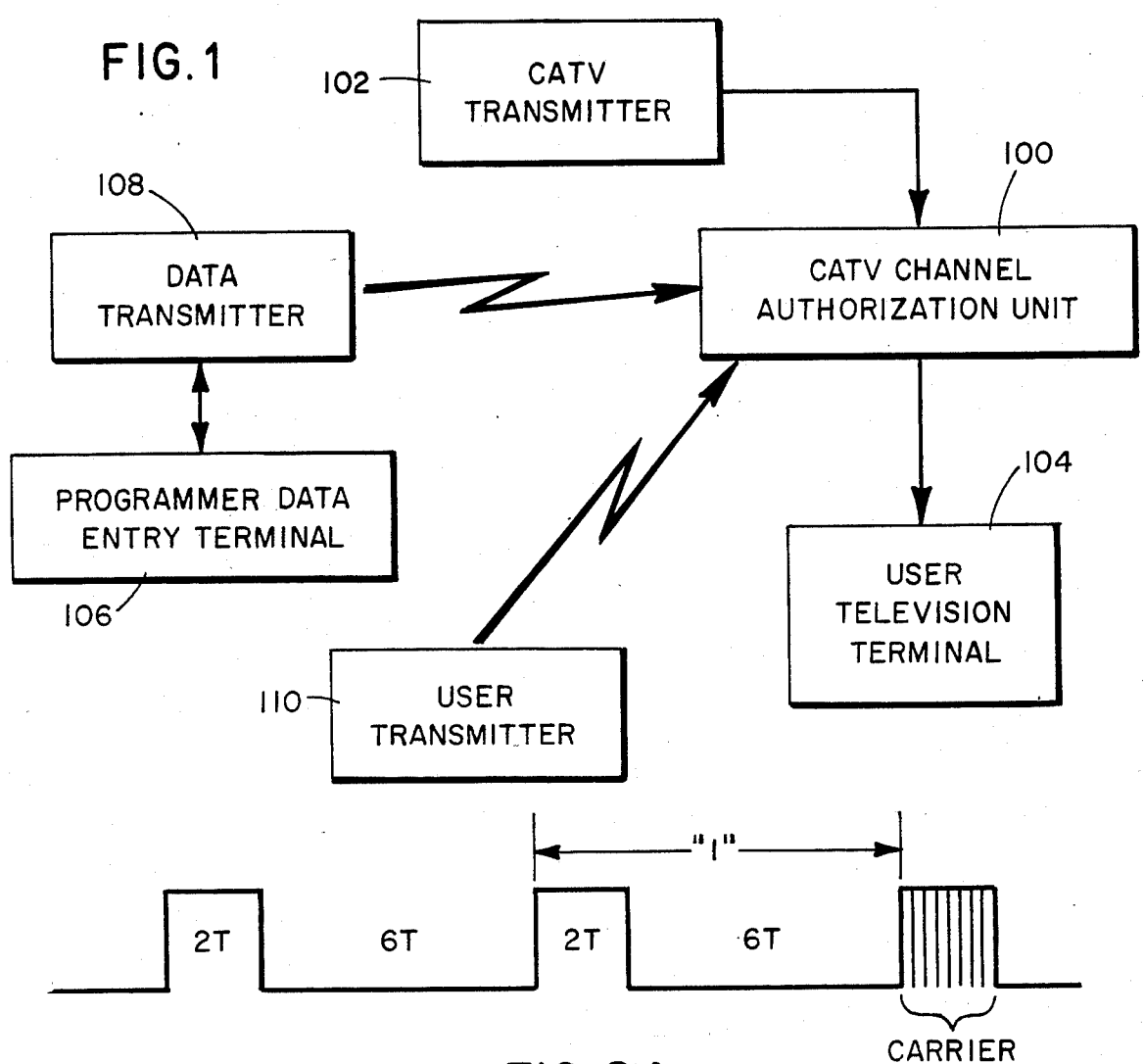
FIG. 1
FIG. 2A
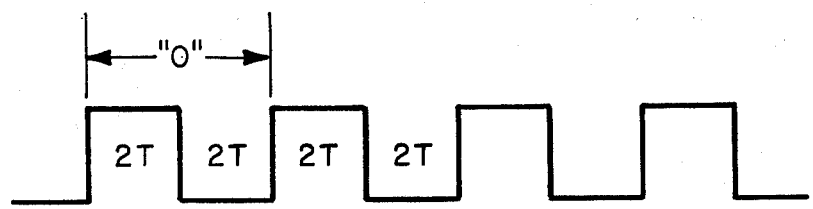
FIG. 2B

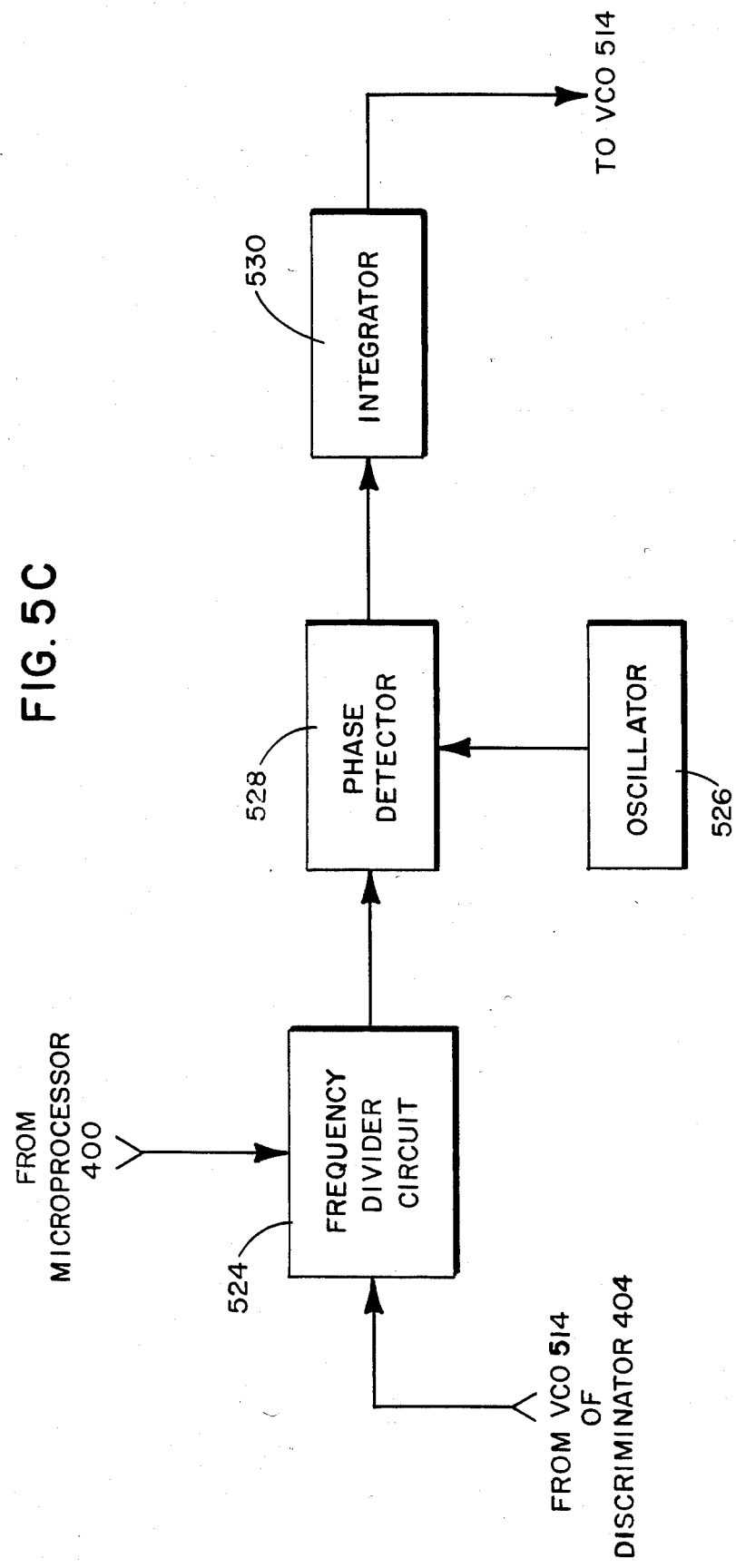

REMOTE PROGRAMMING OF CATV CHANNEL AUTHORIZATION UNIT

BACKGROUND OF THE INVENTION

The present invention is directed in general toward remote control apparatus and, more particularly, toward method and apparatus for programming the selected ones of a plurality of CATV channels which a user is authorized to receive.

Cable television (CATV) has become very popular in recent years. This is primarily due to the improved quality of audio/visual reception provided by CATV transmitters along with the increased channel selection which is provided.

Conventional means for providing CATV service to a user relies upon a channel authorization unit located within the user's residence (usually in close proximity to the user's television set) to insure that the user receives only channels he is authorized to receive. The channel authorization unit receives a plurality of CATV system channels supplied by the CATV transmitter via a dedicated communication link. The channel authorization unit is provided for supplying a plurality of selected channels to the user, which selected channels are those CATV system channels that the particular use is authorized to receive. Typically, the signals provided to the channel authorization unit are provided in a scrambled fashion to prevent the user from bypassing the channel authorization unit and pirating unauthorized channels. Therefore, the channel authorization unit is also adapted to perform a descramble function such that the signal provided to the user's television set is in proper form.

In order to screen channels such that the user only receives those selected channels which he has been authorized to receive, the channel authorization unit is typically preprogrammed by a system programmer before being installed in the user's residence. This preprogramming is usually done by programming a programmable read only memory (PROM), or other similar device, which device is then physically installed within the user's channel authorization unit. However, this method requires time for the system programmer to disassemble the authorization unit and install the PROM device with the newly authorized channels. Further, because these systems require replaceable programmable read only memories, a black market has developed wherein a user can obtain programmed memories from sources other than his CATV supplier. The user then installs the black market programmable read only memory in his unit such that he can receive channels for which he is not authorized.

It is, therefore, desirable to provide method and apparatus for programming a channel authorization unit which method and apparatus does not require physical disassembly of the unit. Additionally, it is desirable to provide a channel authorization unit which is not susceptible to piracy of unauthorized CATV channels.

SUMMARY OF THE INVENTION

It is, therefore, a primary object of the present invention to provide method and apparatus for programming a CATV channel authorization unit.

It is another object of the present invention to provide method and apparatus for programming a CATV channel authorization unit which does not require physical disassembly of the unit.

It is still another object of the present invention to provide a CATV channel authorization unit which is not susceptible to piracy of unauthorized channels.

It is another object of the present invention to provide method and apparatus for programming a channel authorization unit which allows programming to be performed quickly and efficiently.

These and other objects of the present invention are met by providing apparatus and method for programming a CATV channel authorization unit with channel authorization data. The apparatus includes data entry means for receiving channel authorization data from the system programmer. Transmission means are coupled to the data entry means for transmitting channel authorization data to the channel authorization unit via an infrared data communication link. The channel authorization unit includes a receiver for receiving the channel authorization data and data processing means coupled to the receiver for recording the channel authorization data such that the user of the CATV channel authorization unit is only able to receive those channels prescribed by the channel authorization data.

Further, in accordance with the present invention, the channel authorization unit is adapted to receive data from the system programmer in a first format and data from the user in a second format. The channel authorization unit responds to data received in the first format for enabling the user to receive selected ones of the plurality of CATV channels available. The CATV channel authorization unit responds to data received in the second format to select the one of the authorized channels which is to be provided to the user. In this manner, the user is provided with remote control of the CATV authorization unit but is nonetheless unable to control which stations the CATV authorization unit will enable him to receive.

In a further embodiment, the programmer data entry terminal includes means for storing a plurality of channel configurations such that programming a user channel authorization unit with one of the stored configurations eliminates the need for the programmer to first provide detailed programming information to the data entry terminal.

BRIEF DESCRIPTION OF THE DRAWINGS

Further objects, advantages and features of the invention will become apparent from a reading of the following detailed description taken in conjunction with the drawings in which:

FIG. 1 is an illustrative block diagram of the CATV channel authorization system in accordance with the present invention;

FIGS. 2A and 2B show the modulation patterns for a logical one and zero, respectively;

FIG. 5C is a more detailed block diagram of the interface of FIG. 4.

DETAILED DESCRIPTION OF THE PREFERRED EMBODIMENT

Figure 2:
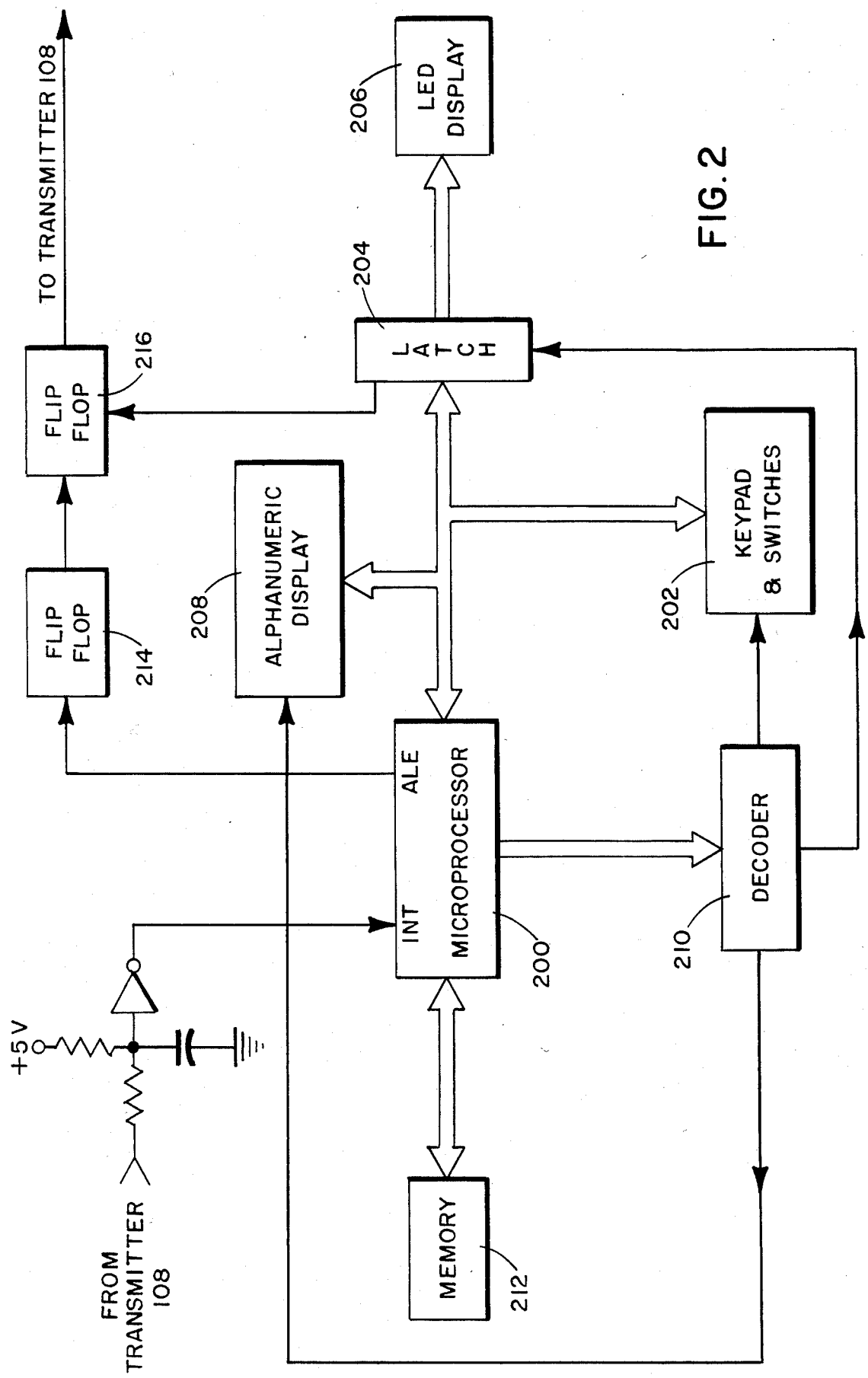
FIG. 2 is a more detailed illustrative block diagram of the programmer data entry terminal illustrated in FIG. 1.

As mentioned hereinabove, the present invention is directed toward method and apparatus for programming a user channel authorization unit. With reference to FIG. 1, there is shown a CATV channel authorization unit 100 which is coupled to receive a plurality of CATV system channels from a CATV transmitter 102 via a dedicated connection. CATV channel authorization unit 100 supplies a plurality of selected channels to a user's television terminal 104. Hence, CATV channel authorization unit 100 is provided to ensure that the user only receives that portion of the CATV system channels transmitted by transmitter 102 which the user is authorized to receive.

To determine which selected channels a user is authorized to receive, CATV channel authorization unit 100 receives channel authorization data from a CATV system programmer via programmer data entry terminal 106, data transmitter 108 and an infrared data communication link. Programmer data entry terminal 106 is provided for receiving channel authorization data from the CATV system programmer and for encoding the received channel authorization data to be transmitted to CATV channel authorization unit 100 via data transmitter 108. Data transmitter 108 is provided for receiving transmission data from data entry terminal 106 and transmitting this data to CATV channel authorization unit 100 via an infrared data communication link.

In a further embodiment, CATV channel authorization unit 100 may be responsive to a user transmitter 110 for changing the one of the selected channels which the user is presently viewing. In this embodiment, programmer data transmitter 108 is adapted to transmit data in a first format while user transmitter 110 is adapted to transmit data in a second format. As used herein, data format is intended to include all means and method for distinguishing data transmissions. For example, data transmissions can be distinguished by altering: the mode of transmitter operation; the type of data which is transmitted; or altering the way in which data is encoded. It will be apparent to those skilled in the art that many other methods may be employed for distinguishing data transmissions. In the present embodiment, transmissions are distinguished by limiting the type of data transmitter 110 is adapted to transmit. In this manner the user has remote control over his viewing selection but is unable to alter the selected channels which he is enabled to receive.

With reference to FIG. 2, there is provided a more detailed illustrative block diagram of data entry terminal 106. Therein, data entry terminal 106 is shown to comprise a microcompressor 200 for performing the data processing functions of the terminal, as will be described below. Microcompressor 200 may comprise any computing device, including all necessary peripheral devices, for performing the data processing and control functions described herein.

Microcompressor 200 is adapted to communicate with a CATV system programmer via a keypad and switches 202. Also, microcompressor 200 is adapted to provide data entry terminal status information to the CATV system programmer via latch 204, LED display 206, alphanumeric display 208 and decoder 210. Keypad 202, latch 204 and LEDs 206 may comprise any conventional devices for performing the named functions, as is known in the art. Alphanumeric display 208 comprises a plurality of seven-segment displays coupled to respective driver devices for receiving information from microprocessor 200 and providing an alphanumeric display therefrom.

Microprocessor 200 is adapted to control the operation of kepad 202, latch 204 and alphanumeric display 208 via a binary coded decimal (BCD) decoder 210. BCD decoder 210 may comprise any means for receiving a binary coded decimal input from microprocessor 200 and providing a plurality of control outputs to keypad 202, latch 204 and alphanumeric display 208. Further, decoder 210 need not comprise a BCD device but may comprise any means for allowing microcompressor 200 to control, or communicate with, the selected data entry devices.

It will be appreciated by those skilled in the art that the apparatus for interfacing the CATV operator with data entry terminal 106 need not consist of the aforementioned devices but may consist of a number of various arrangements for receiving data from and providing system status information to the CATV system programmer. As an example, keypad 202, latch 204 and LEDs 206 may comprise a personal computer interfaced to communicate with microprocessor 200 to allow communication between the programmer and microprocessor 200.

Microprocessor 200 is also shown coupled to memory 212. Memory 212 is provided for storing channel configuration data and system program data. Memory 212 may comprise random access memory as well as read only memory and/or programmable read only memory, as is known in the art. Additionally, memory 212 may comprise any necessary peripheral devices for enabling operation with microprocessor 200. It will be apparent to those skilled in the art that memory 212 may be integrated with microprocessor 200 in whole or in part. In the presently preferred embodiment, a portion of memory 212 comprises random access memory (RAM) and is integrated with microprocessor 200. The remainder of memory 212 comprises electrically erasable programmable read only memory (EEPROM) and is not integrated with microprocessor 200.

In an alternative embodiment, data entry terminal 106 may be adapted to store a plurality of channel configurations to thereby eliminate the need for the system programmer to reprogram standard configurations before transmission. In such an embodiment, memory 212 may be adapted to store the plurality of channel configurations in addition to storing the data discussed above. Further, in this embodiment microprocessor 200 may be adapted to respond to appropriate command signals received from the system programmer to transmit a selected one of the stored channel configurations to channel authorization unit 100 (FIG. 1).

Microprocessor 200 provides transmission data to data transmitter 108 (FIG. 1) via first and second flip flops 214 and 216, and latch 204. In the preferred embodiment, data is transmitted by modulating the duration of a digital infrared carrier signal. Hence, microprocessor 200 controls the output of second flip flop 216 via its reset input to modulate the duration of the digital carrier signal supplied to data transmitter 108. The carrier modulation patterns which correspond to a logical one and zero are shown in FIGS. 2A and 2B, respectively.

In operation, the system programmer provides channel authorization data to microprocessor 200 via keypad and switches 202. The system operator monitors alphanumeric display 208 and LED display 206 to determine the operational status of data entry terminal 106 as data is provided to microprocessor 200 via keypad 202. Microprocessor 200 receives the channel authorization data and formats this data for transmission to channel authorization unit 100. Thereafter, the data is stored in memory 212 until transmission is initiated. To initiate transmission, the programmer activates transmitter 108 which provides a transmit signal to data entry terminal 106 via the INT input of microprocessor 200. Microprocessor 200 then controls latch 204 to provide transmission data to the reset input of second flip flop 216. In this manner the carrier signal, provided by ALE output of microprocessor 200, is modulated with data via the reset input of second flip flop 216 to provide the modulated duration digital infrared transmission signal which will be provided to channel authorization unit 100 via data transmitter 108 and the infrared data communication link.

Figure 3:
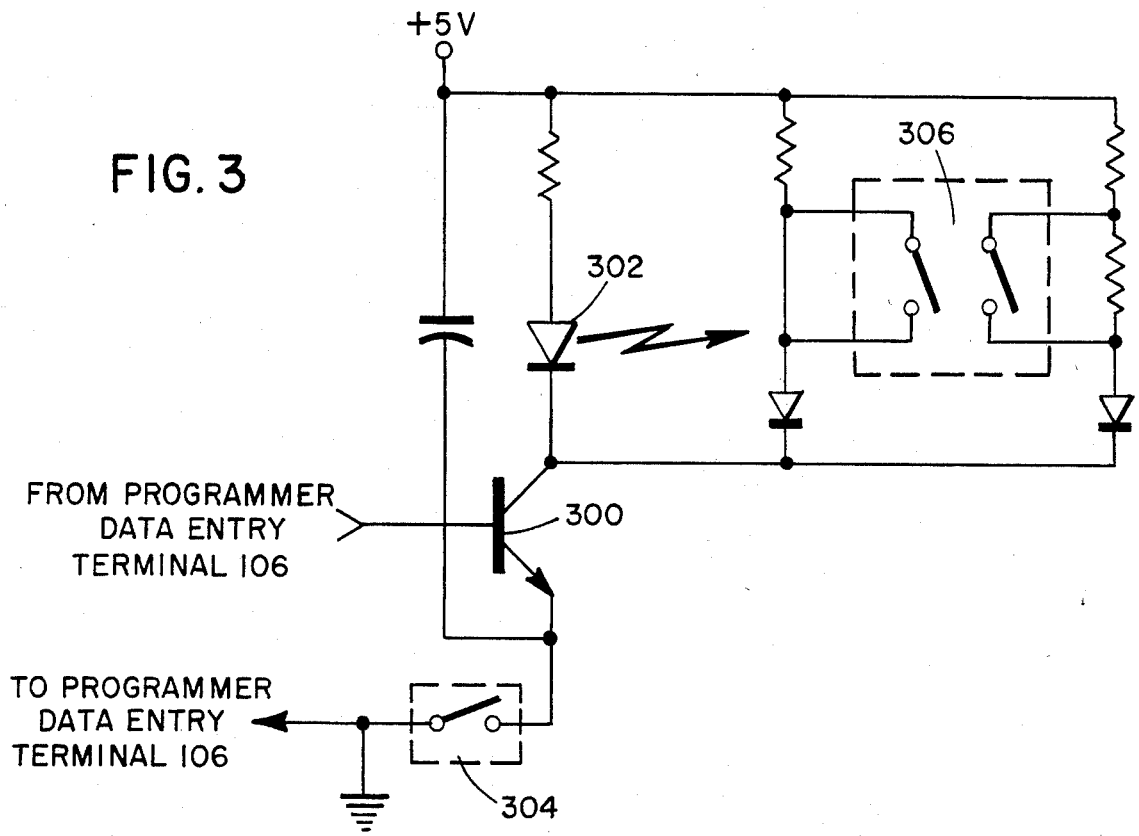
FIG. 3 is a more detailed schematic diagram of the data transmitter illustrated in FIG. 1.

With reference to FIG. 3, there is shown a schematic diagram of digital transmitter 108. Digital transmitter 108 comprises a transistor 300 having its base coupled to receive the modulated carrier from data entry terminal 106. An infrared light emitting diode 302 is coupled intermediate transistor 300 and a 5 volt power source for providing the infrared data signal to be transmitted to CATV channel authorization unit 100 (FIG. 1). When closed, switch 304 provide the transmit signal to the INT input of microprocessor 200 (FIG. 2). Microprocessor 200 then provides data to be transmitted to flip flop 216 via latch 204 as described above. The output of flip flip 216 is connected to the base of transistor 300 causing it to switch on and off as necessary to generate the carrier signal of appropriate frequency, modulated with the desired data. When transmitter 300 is switched on current flows thru infrared LED 302, thus generating an infrared signal at the carrier frequency. Switch 306 is used to adjust the current flow thru infrared LED 302 to either a high or low level thus adjusting the power of transmitted infrared signal.

It will be apparent to those skilled in the art that while the present invention is described herein as modulated duration, infrared, digital communication, other forms of space data communication would work equally as well. As an example, the present invention could be implemented using microwave, AM or FM communication signals. It will be further apparent to those skilled in the art that while the output of second flip flop 216 provides a carrier frequency of approximately 57 KHz for the modulated duration signal, the present invention could be suitably adapted for a carrier of any frequency including baseband communication.

Figure 4:
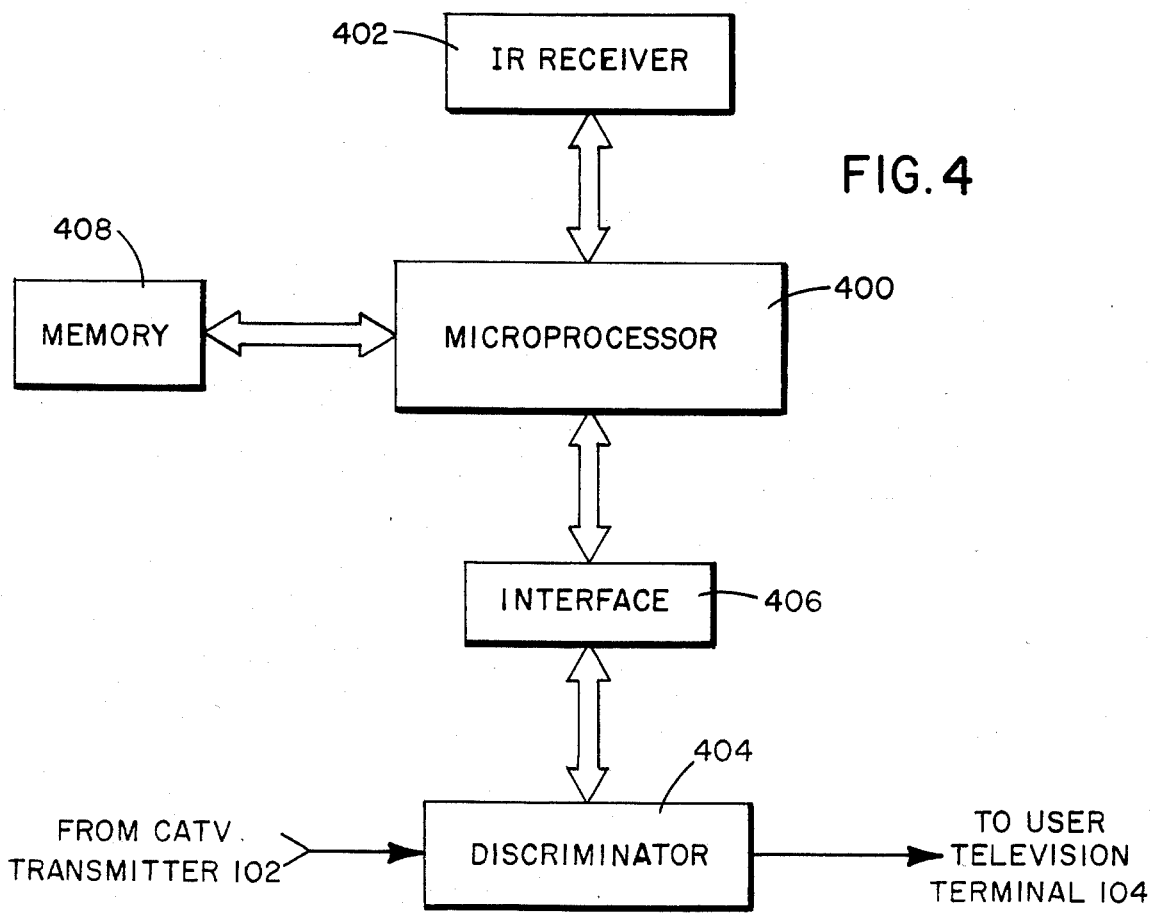
FIG. 4 is a more detailed illustrative block diagram of the CATV channel authorization unit of FIG. 1.

With reference to FIG. 4, there is shown a more detailed illustrative block diagram of CATV channel authorization unit 100. Channel authorization unit 100 comprises a microprocessor 400 for performing data processing functions, as will be described more fully below. Microprocessor 400, like microprocessor 200 may comprise any computing device, including all necessary peripheral devices, for performing the data processing functions described herein.

Microprocessor 400 is in data communication with an infrared receiver 402 for receiving infrared data trasmissions from data transmitter 108. IR receiver 402 may also be adapted to receive infrared transmissions from a user transmitter 110 (FIG. 1) as described herein. IR receiver 402 may comprise any device known in the art for receiving infrared data transmissions. Alternatively, receiver 402 may comprise apparatus for receiving data in accordance with the chosen method of transmission. Also, should two transmitters 108 and 110 be employed, receiver 402 may be adapted to receive data in two formats, e.g., at differing carrier frequencies, for distinguishing between transmissions as discussed above.

Figure 5A:
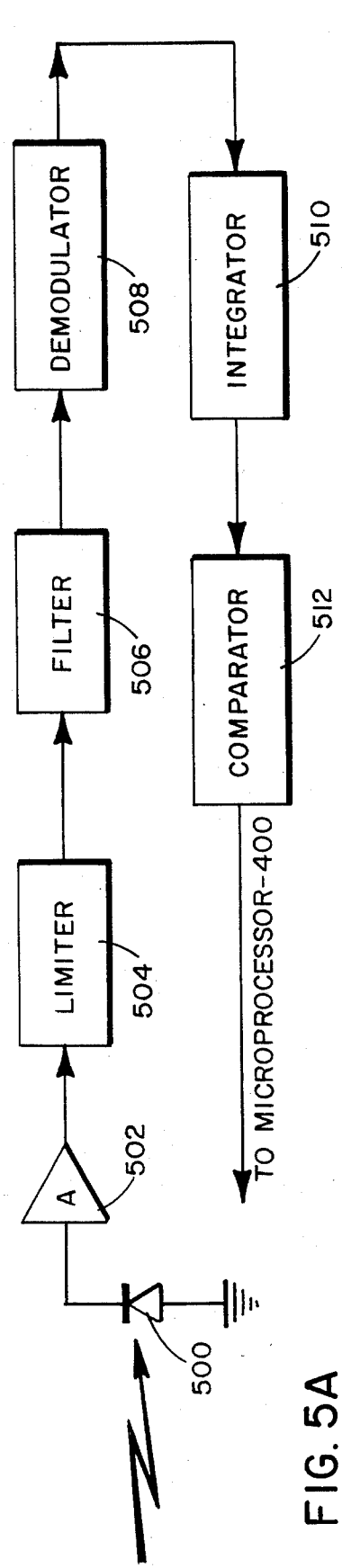
FIG. 5A is a more detailed block diagram of the receiver of FIG. 4.

A typical block diagram for IR Receiver 402 is shown in FIG. 5A. A photo diode 500, being sensitive to infrared light, provides a low level signal to a high grain amplifier 402. A limiter 504 is used in conjunction with amplifier 502 to provide a controlled signal level to a bandpass filter 506. The characteristics of bandpass filter 506 are chosen such that only a signal in the frequency band used for the infrared carrier frequency may pass to a demodulator 508. When a signal passes through bandpass filter 506, demodulator 508 provides charge to integrator 510. Integrator 510 accumulates this charge providing a voltage to comparator 512. If the signal is present for sufficient time, the voltage at the input of comparator 512 will rise to a level that triggers its digital output to change state. Thus the on/off modulation of the infrared carrier signal is demodulated and provided as baseband data to microprocessor 400 where software or other circuitry decodes this data into either data from the user transmitter or the programmer transmitter.

Microprocessor 400 is also in data communication with a channel discriminator 404 via an interface 406. Channel discriminator 404 is adapted to receive each of the plurality of CATV system stations from CATV transmitter 102 and to provide the selected channels to user television terminal 104 (FIG. 1), in response to channel authorization data received from microprocessor 400 via interface 406. Channel discriminator 404 and interface 406 may comprise conventional devices for performing the aforedescribed functions, as is known in the art.

Figure 5B:
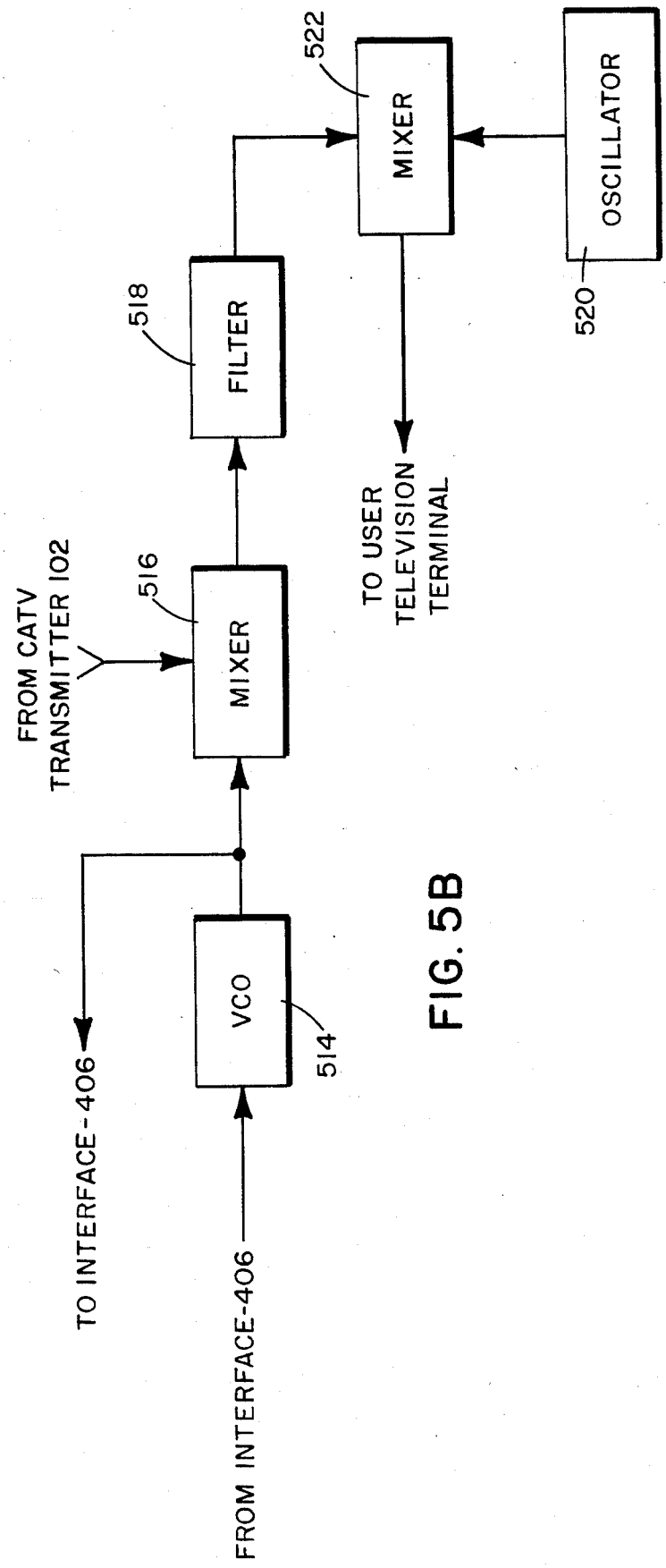
FIG. 5B is a more detailed block diagram of the discriminator of FIG. 4.

As shown in FIG. 5B, discriminator 404 typically contains a voltage controlled oscillator (VCO) 514. A mixer 516 is coupled to VCO 514 and is also coupled to receive the plurality of CATV system chanels from CATV transmitter 102 (FIG. 1). The frequency of VCO 514 is selected by a control signal received from interface 406 such that when the output of VCO 514 is mixed with the incoming RF spectrum from CATV transmitter 102, the desired channel is translated to a predetermined intermediate frequency (IF). The IF signal is filtered, via filter 518, to remove any unwanted image frequencies that may have been introduced in the mixing process. After filtering, the IF signal is translated to the appropriate frequency necessary for the interface to user television terminal 104 (FIG. 1) by mixing the IF signal with the output of another oscillator 520 in mixer 522. In this manner, the scrambled plurality of system channels received from CATV transmitter 102 is descrambled to the IF signal by VCO 514 and mixer 516 in response to control signals received from interface 406. The IF signal is then filtered and adapted for use by user television terminal 104.

To provide the appropriate control to VCO 514 from data received from microprocessor 400, interface 406 contains a phase locked loop circuit that is used to accurately control the frequency of VCO 514. This is accomplished by taking a portion of the output of VCO 514 (see FIG. 5B) and, by use of a frequency divider circuit 524 (FIG. 5C), creating a sample 11 that is an integral sub-multiple of the VCO frequency. The divisor used by the divider circuit is furnished to interface 406 by microprocesor 400 and is chosen such that the resulting sample frequency is equal to a reference frequency as determined by a crystal controlled reference oscillator 526. A phase detector 528 is used to compare the phase of the sample and reference frequencies. Its output is then integrated by integrator 530 to provide the control signal that is used to correct the frequency of VCO 514.

Hence, in order to enable a user to receive a selected channel, microprocessor 400 first determines whether the channel the user is requesting to be provided is authorized. If so, appropriate divisor data is provided to interface 406. This data is used to control the output of VCO 514 to allow proper descrambling of the CATV transmitter signal. Other variations and implementations of this technique are well known in the art.

Microprocessor 400 is also in data communication with memory 408. Memory 408 is provided for storing channel authorization and system program data. Hence, memory 408, like memory 212 (FIG. 2), may comprise random access memory, read only memory and/or programmable read only memory for performing this function. Also, microprocessor 400 may be in data communication with a user channel selector for receiving a channel selection signal which is indicative of a particular channel which the user is requesting to be provided.

In operation, microprocessor 400 receives channel authorization data from a system programmer via data entry terminal 106, data transmitter 108 and IR receiver 402. Microprocessor 400 records this information in memory 408. When a user attempts to access a channel, microprocessor 400 first determines whether the channel being accessed is authorized by consulting memory 408 and, if so, allows the user to receive this channel via channel discriminator 404. Alternatively, should the user attempt to access a channel which is not authorized, then microprocessor 400 will provide an alternate channel, known as a barker channel, to the user via channel discriminator 404.

To authorize receipt of a selected channel, microprocessor 400 provides channel authorization data, which data corresponds to the channel being requested, to interface 406. Interface 406 receives a sample frequency from discriminator 404 and combines the sample with the authorization data from microprocessor 400 to provide a control signal to discriminator 404. Discriminator 404 responds to the control data to properly descramble the signal received from the CATV transmitter and provide the requested channel to the user television terminal.

It will be appreciated by those skilled in the art that the system described above can be used for programming the CATV authorization unit with data in addition to channel authorization data. As an example, this system can be used to provide parental guidance channel data such that a parent, guardian or other supervising adult can determine which of the selected channels children within the household will be unable to receive. In this regard, the above-described system can also be used for supplying the parental authorization code which enables the parent, guardian or supervising adult to access the parental guidance channels. Thus, the system programmer can program not only those channels which are protected by parental guidance channel status but also can program the system with parental guidance authorization codes.

In a further embodiment, CATV channel authorization unit 100 is also responsive to a user transmitter 110 (FIG. 1) for altering the selected channel which the user is presently viewing. In such an embodiment, IR receiver 402 (FIG. 4) is adapted to provide microprocessor 400 with data received from both data transmitter 108 and user transmitter 110. Each transmission is provided by modulating the duration of an infrared digital transmission signal, as described hereinabove by reference to FIG. 2. However, the nature of information being transmitted is distinguished by the format of the data transmission.

In the preferred embodiment, data is transmitted in packets having a header pulse of a specified duration, a five bit custom code, a six bit data word, the complement of the custom code and the complement of the data word. The six bit data word actually contains four bits of hexadecimal information data and two bits of descriptive data. The two bit descriptive data is used to determine whether the four bit information data comprises an address of memory 408, a channel to be stored in an address of memory 408, control and error checking information to initiate the storage procedure or data to be retrieved from memory 408 and provided to the user via channel discriminator 404. User transmitter 110 is only enabled to transmit descriptive data in one format (that being the format which instructs microprocessor 400 to alter the channel being viewed) and, hence, is unable to program memory 408 with additional selected channels. Conversely, data transmitter 108 is able to transmit under any format and, therefore, is able to peform any function.

While only several presently preferred embodiments of the foregoing novel method and apparatus have been described in detail herein, many modifications and variations thereof will readily become apparent to those skilled in the art. It is our intention, by the following claims, to embody all such modifications and variations as fall within the true scope and spirit of our invention.

I claim:

1. Programming apparatus for remotely programming a cable television channel authorization unit of a cable television terminal with channel authorization data, the channel authorization unit of the cable television terminal operable for selecting one channel from a predetermined configuration of authorizad scrambled or unscrambled channels of a plurality of cable television channels transmitted to the terminal over a cable transmission system and responsive to user control via a space data communications link to the terminal, the programming apparatus comprising:

data entry means for producing the predetermined configuration representing said channels authorization data, the data entry means being responsive to programmer control;

transmission means responsive to said data entry means for transmitting the channel authorization configuration data via the space data communication link to the terminal and first data processing means having associated first memory means responsive to said data entry means for producing the channel configuration authorization data, said data processing means encoding the produced channel configuration data for transmission by the transmission means to a receiver means of the terminal; and the receiver means of the terminal for receiving the channel configuration authorization data; said receiver comprising:

second data processing means having associated second memory means, the data processing means responsive to the channel configuration authorization data received at said receiver means for updating the channel authorization data recorded in said second memory means, the cable television channel authorization unit responsive to the data processing means providing a user with access to those channels prescribed by the recorded channel authorization data.

2. Apparatus as recited in claim 1 wherein said data entry means further comprises means for interfacing a cable television programmer with said first data processing means, the cable television programmer providing the appropriate channel configuration authorization data therethrough and receiving data entry means status data therefrom.

3. Programming apparatus for remotely programming a cable television channel authorization unit of a cable television terminal, the channel authorization unit operable for selecting one channel from a predetermined configuration of authorized scrambled or unscrambled channels of a plurality of cable television channels transmitted to the terminal over a cable transmission system responsive to user control via a space data communication link to the terminal, the programming apparatus comprising:

data storage means;

data entry means for producing channel authorization, channel configuration, channel selection and control data from a cable television programmer;

data processing means responsive to said data entry means for storing a plurality of combinations of channel configuration data in said data storage means wherein each combination represents a configuration of authorized channels, said data processing means being responsive to control data signals received from said data entry means for encoding one of the plurality of stored combinations for transmission to said cable television channel authorization unit via the space data communication link, said data processing means being further responsive to control signals received from said data entry means for transmitting channel authorization data produced by said data entry means in a first format and the channel selection in a second format to said cable television channel authorization unit via the space data communication link.

4. Apparatus as recited in claim 3 wherein said data processing means further comprises:

transmission means for transmitting data to the cable television channel authorization unit via the space data communication link;

means for providing a carrier signal of a predetermined frequency; and means for modulating the carrier signal with the channel authorization, configuration, selection and control data to be transmitted to the cable television channel authorization unit, said modulation means being coupled to said transmission means for transmitting the modulated channel authorization, configuration, selection and control data to the cable television channel authorization unit.

5. Programming apparatus for remotely programming a cable television channel authorization unit of a cable television terminal over a first space data communications link, the channel authorization unit including a receiver operable for receiving data indicating one channel from a configuration of authorized scrambled or unscrambled channels of a plurality of cable television channels transmitted to the terminal over a cable transmission system, said data being transmitted in a first format from a user via a second space data communication link to the receiver, said programming apparatus comprising:

data entry means for producing channel configuration authorization data from a system programmer and for transmitting the channel configuration data to said receiver in a second format via the first space data communications link;

the data entry means comprising:

means for transmitting data in the first format to the receiver of the cable television channel authorization unit;

first data processing means having associated first memory means responsive to the channel configuration authorization data from the system programmer for encoding the channel configuration authorization data in the second format to be trasmitted to the cable television channel authorization unit;

means for supplying a carrier signal of a predetermined frequency; and means for modulating the encoded data in the second format with the carrier signal to be transmitted to the cable television channel authorization unit, and the cable television authorization unit comprising a second data processing means coupled to said receiver and responsive to data received in the second format for preventing the user of the cable television channel authorization unit from receiving unauthorized channels, said second data processing means being responsive to data received in the first format for changing the channel which the user is presently viewing.

6. Apparatus as recited in claim 5 wherein said data entry means comprises:

means for transmitting data in the first format to the receiver of the cable television channel authorization unit;

first data processing means for receiving the channel configuration authorization data from a system programmer and for encoding the channel configuration authorization data in the second format to be transmitted to the cable television channel authorization unit;

means for supplying a carrier signal of a predetermined frequency; and means for modulating the encoded data in the second format with the carrier signal to be transmitted to the cable television channel authorization unit.

7. Apparatus for providing user with a particular authorized configuration of selected cable television system channels from among a plurality of scrambled or unscrambled cable television system channels comprising:

a cable television terminal comprising:

channel authorization means for descrambling the authorized plurality of scrambled cable television system channels, said channel authorization means being coupled to a user's television terminal and providing the authorized configuration from the plurality of selected cable televisions channels thereto;

means for receiving channel configuration authorization data in a first format via a space data communication link, said receiving means being coupled to said channel authorization means for providing channel authorization data received over the space data communication link to said authorization means; and remote programming apparatus comprising:

data entry means for producing channel configuration authorization data, said data entry means being adapted to transmit the channel configuration authorization in the first format to said data receive means via the space data communications link, said channel authorization means being responsive to the channel configuration authorization data for enabling the descrambling of scrambled channels of the authorized configuration of cable television system channels to be supplied to the user's television terminal, cable television channel selection data being transmitted in a second format, via the space data communications link.

8. Apparatus as recited in claim 7 wherein said data entry means of the remote programming apparatus comprises first transmit means for trasmitting channel authorization data to said receiving means, said apparatus further comprising second transmit means for transmitting the cable television channel selection data to said receiving means, said first and second trasmit means being adapted to transmit data in the first and second formats, respectively, said channel authorization means being responsive to data received in said first format for updating the configuration of selected cable television channels which the user is enabled to receive and said channel authorization means being response to data received in said second format for changing the channel displayed.

9. Apparatus as recited in claim 8 wherein said first format comprises data selected from a first group and wherein said second format comprises data selected from a second group such that said first and second transmit means are adapted to transmit data from the first and second groups, respectively.

10. Apparatus as recited in claim 7 wherein said channel authorization means further comprises:

discriminator means for receiving the plurality of scrambled cable television system channels transmitted from a cable television tramsitter, said discriminator means being responsive to a control signal for descrambling a predetermined one of the selected scrambled channels to be provided to the user's television terminal;

channel selection means for receiving a channel selection data signal from a user;

memory means for storing channel configuration authorization data;

means for processing data, said data processing means being coupled to said first receiving means for receiving channel configuration authorization data therefrom, said data processing means being further coupled to said memory means for storing channel configuration authorization data received from said first receiving means, said data processing means being responsive to the channel selection data signal for determining whether the selected channel is authorized and, if so, providing a control signal corresponding to the selected channel to said discriminator means and, if not, providing a control signal corresponding to an alternate channel to said discriminator means.

11. Apparatus as recited in claim 10 wherein said data entry means comprises first transmit means for transmitting channel configuration authorization data to said first receiving means, and wherein said channel selection means comprises second transmit means for transmitting cable television channel selection data to said first receiving means, said first and second transmit means being adapted to transmit data in first and second formats, respectively, said channel authorization means being responsive to data received in said first format for changing the particular configuration of selected channels which the user is enabled to receive and said channel authorization means being responsive to data received in said second format for changing the channel which is being provided to the user.

12. A method for programming a cable television channel authorization unit of a cable television terminal from remote control programming apparatus over a first space data communications link comprising the steps of:

(a) providing channel configuration data which specifies which ones of a plurality of scrambled or unscrambled cable television system channels a user is authorized to receive;

(b) translating the provided channel configuration data into channel authorization data for transmission in a first format over the first space data communications link;

(c) transmitting the channel authorization data in the first format to the cable television channel authorization unit via the first space data communication link;

(d) receiving the channel authorization data and storing the channel authorization data with associated data as to the scrambled or unscrambled character of the authorized channel;

(e) responding to the stored channel authorization data to enable the user to receive only those scrambled or unscrambled cable television system channels specified by the channel authorization data; and (f) responding to user channel selection data for selecting a scrambled channel by descrambling the selected scrambled channel only if the selected channel is authorized, the channel selection data being transmitted in a second format over a second space data communication link.

13. Programming apparatus for remotely, programming a cable television channel authorization unit of a cable television terminal with channel authorization data and feature data, the channel authorization unit of the cable television terminal operable responsive to user control for selecting one channel from a predetermined configuration of authorization scrambled or unscrambled channels of a plurality of cable television channels transmitted to the terminal over a cable transmission system for display, the programming apparatus comprising:

data entry means for producing the predetermined configuration representing said channel authorization data and the feature data, the data entry means being responsive to programmer control;

transmission means responsive to said data entry means for transmitting the channel authorization configuration data and the feature data via an infra-red data communications link to the cable television terminal; and data processing means having associated memory means, the data processing means responsive to said data entry means for producing the channel configuration authorization data and the feature data, the data processing means encoding the produced channel configuration authorization data and the feature data into a first format for transmission by the transmission means, the first format being a different format from a second format for data for selecting a channel to be displayed, an infra-red data receiver of the cable television terminal operable to receive data in either the first or the second format.

* * * * *